July 3, 1934.                C. E. SMELSER                1,964,965
LEVEL WIND MECHANISM
Filed Jan. 26, 1933
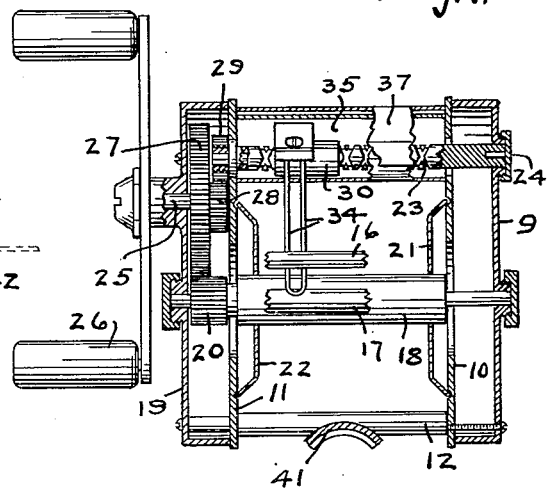
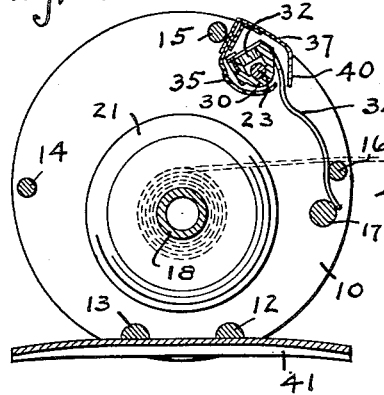
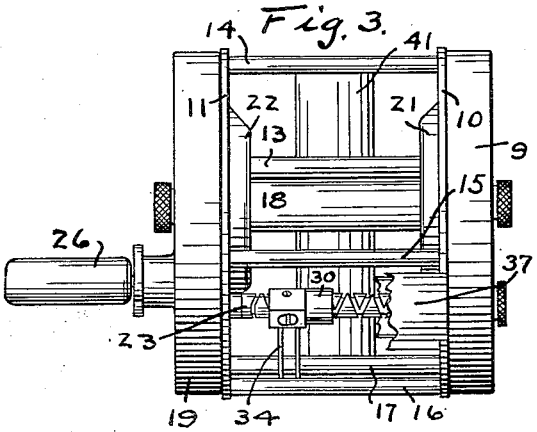
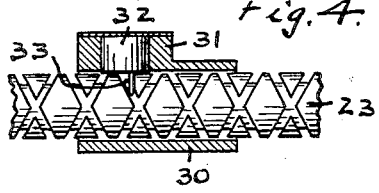
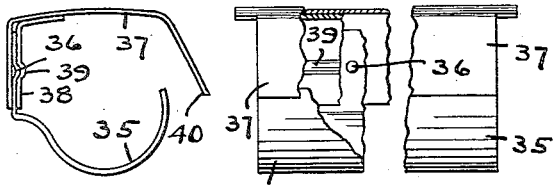
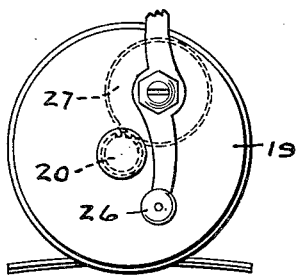
Inventor,
Chester E. Smelser,
By Minturn & Minturn,
Attorneys.

Patented July 3, 1934

1,964,965

UNITED STATES PATENT OFFICE 1,964,965

LEVEL WIND MECHANISM

Chester E. Smelser, Shelbyville, Ind.

Application January 26, 1933, Serial No. 653,562

5 Claims. (Cl. 242—84.4)

This invention relates to the art of fishing reels and particularly to a level winding means. A primary object of my invention is to provide a level winding means for the line whereby water and grit are prevented from entering into the bearings and other parts of the winding mechanism. A further primary object of my invention is to provide a level winding structure to have such form that the wear on the gears and bearings entering into the structure will be reduced by means of counteracting thrusts. A further important object of my invention is to provide means for retaining a lubricant on a screw shaft and at the same time form such means as to permit ready removal thereof for inspection and replacement of parts as necessary.

These and other objects and advantages of the invention will become apparent to those versed in the art in the following description which is made in reference to the accompanying drawing, wherein Fig. 1 is a fragmentary vertical transverse section through a reel embodying my invention;

Fig. 2, a vertical longitudinal section through the reel on a plane parallel with and intermediate the stems of the line guide in Fig. 1;

Fig. 3, a fragmentary top plan view of the reel;

Fig. 4, a detail in fragmentary vertical section showing the screw shaft and carrier on an enlarged scale;

Fig. 5, a similar detail with the engaging pawl in a reversed position;

Fig. 6, a fragmentary front elevation of the shaft and carrier housing on an enlarged scale;

Fig. 7, an end elevation of the housing, and

Fig. 8, an end elevation of the reel on a slightly reduced scale indicating the gear drive.

Like characters of reference indicate like parts throughout the several views in the drawing.

Between the two plates 10 and 11 which are spaced apart in parallel relation by the ties 12, 13, 14, 15, 16 and 17, is positioned a spool 18 having a bearing at one end in the cap 9, and extending by its axle through the plate 11 to have a supporting bearing in a cap 19 which is attached about the outer side of the plate 11. Between the plate 11 and the cap 19, the axle of the spool 18 carries a spur gear 20. The spool 18 is provided with the usual flanges 21 and 22 between which the fishing line is wound in the usual manner.

Above the spool 18 and ahead of the spool 18 is revolubly carried a screw shaft 23 between the cap 9 and plate 11, in parallel alignment with the axle of the spool 18. This shaft 23 has a continuous thread cut on it extending entirely thereacross in one direction and then back again in the opposite direction. The end of the shaft which is adjacent the plate 10 is extended therethrough with clearance therearound and is carried about a pin extending inwardly from a cap 24, the bearing here shown being in more or less diagrammatic form, the essential feature being that the shaft extends through the plate 10 a distance with clearance therearound. The other end of the shaft 23 is revolubly carried by the plate 11 and has a spur gear 29 fixed on its end outside of the plate 11 within the cap 19. Above the axle of the spool 18 and somewhat below the shaft 23 is revolubly mounted a stub shaft 25 in the cap 19 to have a hand crank 26 secured to its outer end and a gear 27 meshed with the pinion gear 20 and also a smaller gear 28 in mesh with the gear 29 above referred to on the end of the shaft 23. By means of this gear arrangement, rotation of the crank 26 will revolve the gear 27 to in turn revolve the spool 18 and the shaft 23 in definite relation one to the other.

On the shaft 23 is mounted a carrier or sleeve 30 in such manner that the sleeve is free to slide longitudinally along the shaft. Toward one end of this sleeve 30 is provided an upturned boss 31 within which is revolubly carried the relatively short post 32 with a downwardly extending tongue 33 which engages with the threads on the shaft 23. A line guide 34 is fixed to the sleeve, here shown at the forward side of the boss 31 and is bent downwardly and then forwardly and around under the tie 16 and over the tie 17. This guide 34 is formed in the usual manner by looping a wire to have its ends carried by the sleeve. The extension of the guide to between the ties 16 and 17 holds the sleeve 30 against rotation about the shaft 23 but permits the sleeve to be shifted longitudinally along the shaft. A lower housing member 35, Figs. 6 and 7, is formed to be carried between the plates 10 and 11 to encircle the under side of the shaft 23 with sufficient clearance thereunder to permit the sleeve 30 to slide along the shaft within this part of the housing without interference therefrom. The major portion of this section of the housing 35 is substantially semi-circular and has a rear end turned upwardly with a number of detents 36 formed therein. A removable top section 37 of the housing is formed to be essentially U-shaped in vertical section to have a rear downturned leg adapted to slide down over the rear side of the upturned member of the section 35 and is also provided with a forwardly spaced leg 38 adapted to slide frictionally over the forward face of that member and to have a rib 39 spaced to receive the detents 36 therein as a means for retaining the member 37 in place, the forward leg 38 being a spring-like member. The section 37 is carried by its upper part forwardly to beyond the front edge of the lower section 35 and has a down turned leg 40 extending downwardly to approximately the top edge of the front side of the section 35 or slightly therebelow and spaced forwardly therefrom to leave an opening therebetween. It is through this opening that the guide 34 extends, Fig. 2. The usual mounting plate 41 is provided across the under sides of the lower ties 12 and 13.

In employing the structure as above described, a line 42 indicated by the dash lines in Fig. 2 is wound about the axle of the spool 18 to have the line leading off from the top of the winding forwardly through the guide 34 over the tie 16.

In winding the line 42 on the spool the handle or crank 26 is turned in a clockwise direction and it is therefore to be seen that, since the line is pulling forwardly on the upper side of the axle of the spool and the gear 27 is tending to pull rearwardly on that same side as it meshes with the gear 20, one thrust will tend to counteract the other and thereby relieve the thrust on the axle bearings as would otherwise result from components of thrusts, particularly in the structure heretofore employed wherein the gear 27 is commonly meshed with the under side of the gear 20 in place of on top.

Also as the crank 26 is turned to wind the line about the spool, the shaft 23 is revolved and therefore the sleeve 30 through its interconnecting tongue 33 is shifted across and back along the shaft 23 thereby causing the guide 34 to feed the line 42 similarly back and forth along the axle of the spool 18 so as to cause the line to be wound evenly thereacross. Since the particular mounting of the shaft 23 places it above the spool 18 and causes the guide 34 to extend principally downwardly, the water carried by the line 42 as it may be scraped off of the line by rubbing against the guide 34 drains downwardly thereaway by the influence of gravity and there is no tendency for the water to reach the shaft 23. There is also usually some sand or grit brought back by the line 42 as it is wound upon the spool and this grit is carried away from the line by the water as it drains as above indicated. Not only is the water prevented from reaching the shaft 23 but by reason of its particular mounting and the housing members 35 and 37, the housing may be supplied with grease to be retained by the lower section 35 particularly so that the screw may be supplied with grease to provide the proper lubrication between it and the sleeve 30 moving therealong. The sleeve 30 may have considerable length to prevent rocking on the shaft 23 since its "overhang" beyond the boss 31 may enter and pass through the opening in the plate 10 about the end of the shaft and thereby permit the guide 34 to bring the line well up against the end flange 21 on the spool. At any time, the upper portion 37 of the housing may be lifted to permit inspection and to permit additional lubrication as may be desired. This upper portion 37 effectively closes over the shaft 23 to prevent accidental contact of the shaft by the operator's thumb or fingers and conveniently serves as an additional means for gripping the reel.

While I have here shown and described my invention in the one best form as now known to me, it is obvious that structural changes may be made without departing from the spirit of the invention and I therefore do not desire to be limited to that precise form beyond the limitations as may be imposed by the following claims.

I claim:

1. In a fishing reel, a line winding spool, a screw shaft above the spool, a member engaging the thread of said shaft to be shifted therealong upon rotation of the shaft, and a line guide shiftable by said member, said guide being formed to extend downwardly and forwardly of said spool whereby dirt and water scraped from the line as it is wound on the spool may drop downwardly away from said shaft, and a housing about said shaft with an upper forwardly overhanging cover from under which said guide extends, said housing being cupped around the under side of the shaft, and said cover being detachably retained along its rear side by the housing.

2. In a level winding reel, a line receiving spool, a screw shaft above the spool, a line guide shiftably carried by the shaft and extending downwardly on the forward side of the spool, and a two-part housing surrounding said shaft from the under and top sides thereof respectively.

3. In a level winding reel having a screw shaft for shifting a line guide, a housing for the shaft comprising an under member cupped around the under side of the shaft, an upturned tongue along the rear of the under member, a top cover having a back downturned leg and a lip between which said tongue is received, and a front leg extending downwardly in spaced relation forwardly of the front edge of said under member to leave a slot-like opening therebetween.

4. In a level winding reel, a line receiving spool, a screw shaft above the spool, a line guide shiftably carried by the shaft and extending downwardly on the forward side of the spool, and a two-part housing surrounding said shaft from the under and the top sides thereof respectively, the top member being removable independently of the under member.

5. In a level winding reel, a line receiving spool, a screw shaft above the spool, a line guide shiftably carried by the shaft and extending downwardly on the forward side of the spool, and a two-part housing surrounding said shaft from the under and the top sides thereof respectively, the bottom member having a rear upturned end with detents and the top member having a rear downturned leg, and a second leg spaced forwardly of the first leg receiving the upturned end of the bottom member closely between them, said legs having means for removably engaging the detents of the bottom member.

CHESTER E. SMELSER.